(12) United States Patent
Lim et al.

(10) Patent No.: US 7,417,696 B2
(45) Date of Patent: Aug. 26, 2008

(54) LIQUID CRYSTAL DISPLAY DEVICE AND FABRICATING METHOD THEREOF

(75) Inventors: Joo Soo Lim, Kyoungsangbuk-do (KR); In Byeong Kang, Kyoungsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 258 days.

(21) Appl. No.: 09/840,082

(22) Filed: Apr. 24, 2001

(65) Prior Publication Data

US 2001/0046005 A1 Nov. 29, 2001

(30) Foreign Application Priority Data

May 19, 2000 (KR) ...................... 10-2000-0026876

(51) Int. Cl.
*G02F 1/1333* (2006.01)
*G02F 1/136* (2006.01)
*G02F 1/1343* (2006.01)

(52) U.S. Cl. ............................. 349/110; 349/44; 349/38

(58) Field of Classification Search .................. 349/44, 349/38, 110, 111, 43
See application file for complete search history.

(56) References Cited

U.S. PATENT DOCUMENTS

| | | | | |
|---|---|---|---|---|
| 5,339,181 A | * | 8/1994 | Kim et al. | 349/38 |
| 5,708,483 A | * | 1/1998 | Asai | 349/38 |
| 5,724,107 A | * | 3/1998 | Nishikawa et al. | 349/38 |
| 5,739,880 A | * | 4/1998 | Suzuki et al. | 349/110 |
| 5,777,701 A | * | 7/1998 | Zhang | 349/44 |
| 5,789,761 A | * | 8/1998 | Ihara et al. | 349/44 |
| 5,866,919 A | * | 2/1999 | Kwon et al. | 257/59 |
| 6,075,580 A | * | 6/2000 | Kouchi | 349/110 |
| 6,091,467 A | * | 7/2000 | Kubo et al. | 349/44 |
| 6,172,728 B1 | * | 1/2001 | Hiraishi | 349/139 |
| 6,266,117 B1 | * | 7/2001 | Yanagawa et al. | 349/141 |
| 6,268,895 B1 | * | 7/2001 | Shimada et al. | 349/110 |
| 6,297,862 B1 | * | 10/2001 | Murade | 349/44 |
| 6,327,006 B1 | * | 12/2001 | Sato et al. | 349/44 |
| 6,466,282 B2 | * | 10/2002 | Sasuga et al. | 349/58 |
| 6,556,265 B1 | * | 4/2003 | Murade | 349/111 |

FOREIGN PATENT DOCUMENTS

| | | |
|---|---|---|
| JP | 03-148636 | 6/1991 |
| JP | 04-194823 | 7/1992 |

OTHER PUBLICATIONS

Office Action issued Mar. 28, 2002 in Korean patent application No. P00-26876.

* cited by examiner

*Primary Examiner*—Mike Qi
(74) *Attorney, Agent, or Firm*—Morgan, Lewis & Bockius LLP

(57) ABSTRACT

A liquid crystal display device includes a pixel electrode at a pixel area between a gate line and a data line, a switching device at an intersection between the gate line and the data line, the switching device comprising a light-shielding member overlapping the switching device and extending from an end at the pixel electrode side of a metal thin film provided within the switching device into the pixel area, for blocking light incident on the metal thin film.

1 Claim, 5 Drawing Sheets

LIQUID CRYSTAL DISPLAY DEVICE AND
FABRICATING METHOD THEREOF

This application claims the benefit of Korean Patent Application No. P00-26876 filed May 19, 2000, which is hereby incorporated by reference.

BACKGROUND OF THE INVENTION

1. Field of the Invention

This invention relates to a liquid crystal display, and more particularly to a liquid crystal display device and method of fabricating the same that reduces a reflectivity of an LCD display screen.

2. Description of the Related Art

Generally, a liquid crystal display (LCD) of an active matrix driving system uses thin film transistors (TFT's) as switching devices to display images. Since such LCD's can be made smaller than cathode ray tubes, they have been widely used as monitors for personal computers or notebook computers, as well as in office automation equipment, such as copy machines, etc. . . and in portable equipment, such as a cellular phones and pagers, etc.

Referring to FIGS. 1 and 2, in the conventional LCD device, a gate line 14 and a data line 13 is formed on a rear substrate 1 crossing each other, and a pixel electrode 10 is formed at the interior thereof. A TFT 12 is formed at an intersection between the gate line 14 and the data line 13.

The TFT 12 includes a gate electrode 3, a source electrode 6 and a drain electrode 7 to apply a data signal at the data line 13 to the pixel electrode 10 during an application of a scanning pulse to the gate electrode 3. The gate electrode 3 is connected to the gate line 14, while the source electrode 6 is connected to the data line 13. The drain electrode 7 is connected, via a contact hole 9, to the pixel electrode 10, which is deposited with a transparent conductive material such as indium-tin-oxide (ITO). A gate insulating film 4, deposited using an inorganic insulating material, is formed on the gate electrode 3 and the gate line 14, and an active layer 20 and an ohmic contact layer 5 are deposited thereon. A passivation layer 8 made from either an inorganic insulating material or an organic insulating material is formed on the TFT 12.

In the conventional LCD device, a storage capacitor 19 is provided on the gate line 14. The storage capacitor 19 accumulates a driving voltage (charge) of the next scanning line during the previous scanning period, to thereby lower the driving voltage. An upper electrode 15 of the storage capacitor 19 is made from a metal alloy upon formation of the source electrode 6 and the drain electrode 7, as shown in FIG. 3. The gate line 14 that overlaps the upper electrode 15 serves as a lower electrode of the storage capacitor 19. The upper electrode 15 of the storage capacitor 19 is connected, via a contact hole 16 passing through a passivation layer 8, to the pixel electrode 10.

A black matrix 11 is provided on a front substrate 2, which is opposed to the rear substrate 1, with a liquid crystal therebetween. The black matrix 11 is positioned at a portion other than an effective display area of a pixel to absorb all wavelengths of light incident thereon. Further, on the front substrate 2 there are provided a common electrode, a color filter and an alignment film (not shown) in addition to the black matrix 11.

Such an LCD device has a problem in that a large amount of reflective light is generated at the display screen due to a structure of the black matrix 11. More specifically, the black matrix 11 does not overlap with a pixel electrode side portion 17 of the drain electrode 7 and a pixel electrode side portion 18 of the upper electrode 15 of the storage capacitor, as shown in FIG. 1, due to its pattern structure. As a result, as shown in FIGS. 2 and 3, when external light is incident on areas O1 and O2 of the black matrix 11, the upper electrode 15 of the storage capacitor and on the drain electrode 7, it is reflected from the upper electrode 15 and the drain electrode 7, which are made of metal. Such a reflected light is incident on a user's eye, and reduces the contrast, thereby reducing quality of a displayed image. For instance, since an aircraft cockpit is exposed to direct sunlight, various LCD panels installed in the cockpit of the aircraft generate a large amount of reflected light. Therefore, the LCD panel in an aircraft may have a deterioration of picture clarity due to the reflected light, sometimes causing pilot error.

SUMMARY OF THE INVENTION

Accordingly, it is an object of the present invention to provide a liquid crystal display and a fabricating method thereof that reduce a reflectivity of the display screen.

In order to achieve these and other objects of the invention, a liquid crystal display device according to one aspect of the invention includes a pixel electrode at a pixel area between a gate line and a data line, a switching device at an intersection between the gate line and the data line, the switching device comprising a light-shielding member overlapping the switching device and extending from an end at the pixel electrode side of a metal thin film provided within the switching device into the pixel area, for blocking light incident on the metal thin film.

A liquid crystal display device according to another aspect of the present invention includes a pixel electrode at a pixel area between a gate line and a data line, a charging device on the gate line, the charging device including a metal thin film, a light-shielding member overlapping the charging device and extending from an end at the pixel electrode side of a metal thin film into the pixel area, for blocking light incident on the metal thin film.

A liquid crystal display device according to still another aspect of the present invention includes a pixel electrode at a pixel area between a gate line and a data line, a thin film transistor at an intersection between the gate line and the data line and including a first metal thin film a storage capacitor on the gate line and including a second metal thin film, a black matrix at a boundary portion between pixel areas, first dummy black matrix connected to the black matrix and extending from an end at the pixel electrode side of the metal thin film into the pixel area, and a second dummy black matrix connected to the black matrix and extending from an end at the pixel electrode side of the second metal thin film into the pixel area.

A method of fabricating a liquid crystal display device according to still another aspect of the present invention includes the steps of forming a pixel electrode at a pixel area between a gate line and a data line, forming a switching device including a metal thin film at an intersection between the gate line and the data line, and forming a light-shielding member for blocking light incident on the metal thin film to overlap with the switching device, the light-shielding member extending from an end at the pixel electrode side of a metal thin film of the switching device into the pixel area.

A method of fabricating a liquid crystal display device according to still another aspect of the present invention includes the steps of forming a pixel electrode at a pixel area between a gate line and a data line, forming a charging device including a first metal thin film on the gate line, and forming a light-shielding member for blocking light incident on the metal thin film to overlap the metal thin film, the light-shielding member extending from an end at the pixel electrode side of the first metal thin film into the pixel area.

A method of fabricating a liquid crystal display device according to still another aspect of the present invention includes the the steps of forming a pixel electrode at a pixel area between a gate line and a data line on a rear substrate, forming a thin film transistor including a first metal thin film at an intersection between the gate line and the data line on the rear substrate, forming a storage capacitor including a second metal thin film on the rear substrate and overlapping the gate line, forming a black matrix on a front substrate opposed to the rear substrate at a boundary portion between pixel areas, forming a first dummy black matrix extending from an end at the pixel electrode side of the first metal thin film into the pixel area on the front substrate, and forming a second dummy black matrix extending from an end at the pixel electrode side of the second metal thin film into the pixel area on the front substrate.

BRIEF DESCRIPTION OF THE DRAWINGS

These and other objects of the invention will be apparent from the following detailed description of the embodiment of the present invention with reference to the accompanying drawings.

In the drawings.

DETAILED DESCRIPTION OF THE PREFERRED EMBODIMENT

Figure 1:
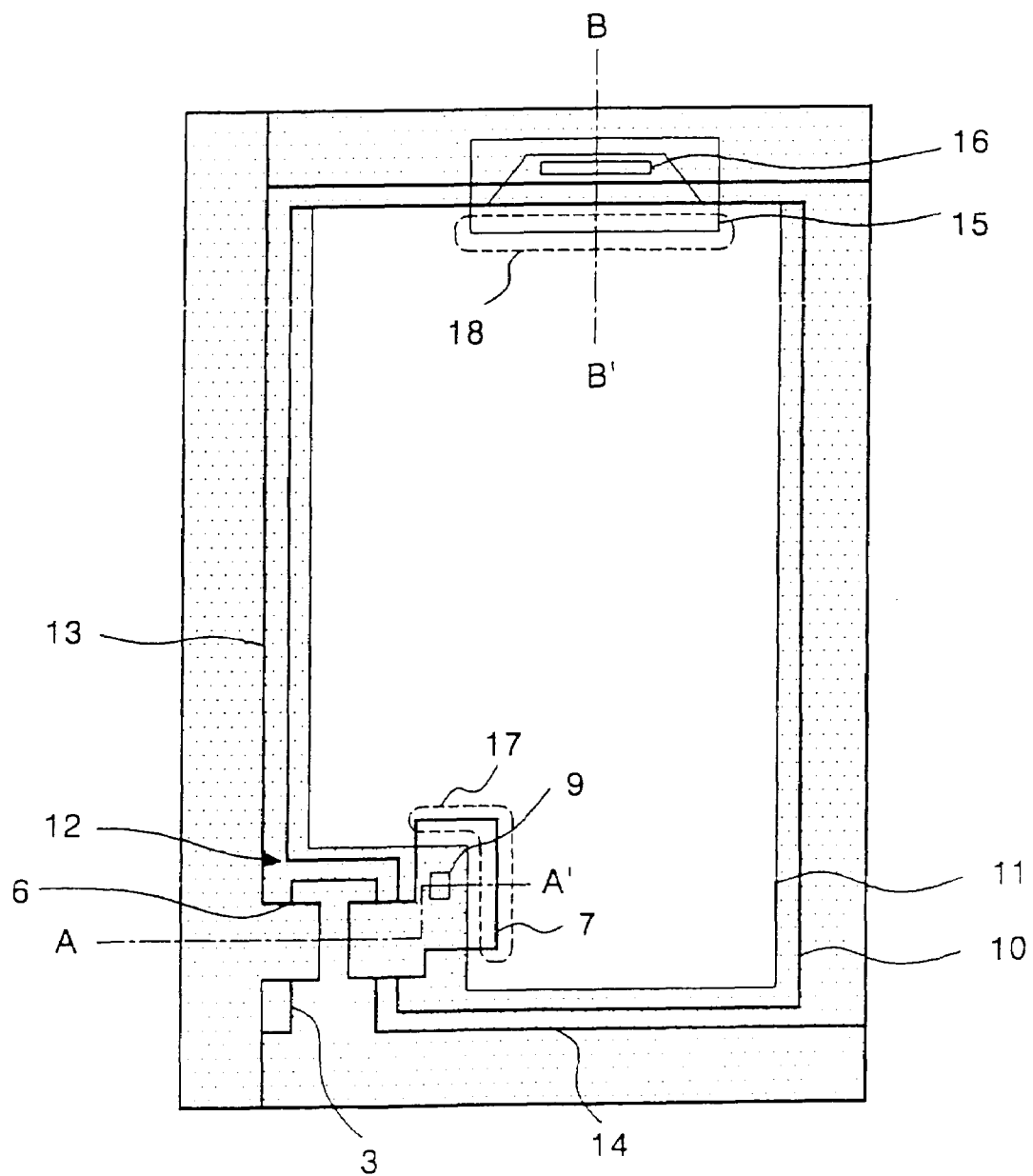
FIG. 1 is a plan view showing a structure of one pixel at a rear substrate of a conventional liquid crystal display device.
Figure 2:
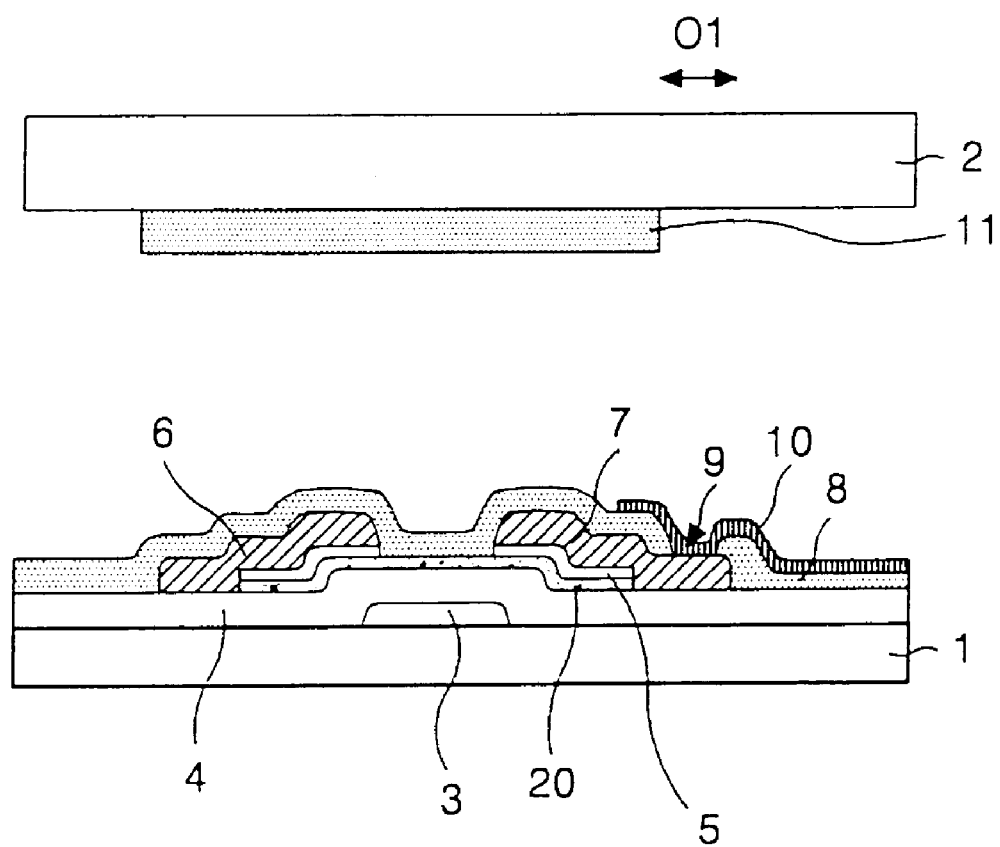
FIG. 2 is a section view of a thin film transistor taken along the line A-A' of FIG. 1.
Figure 3:
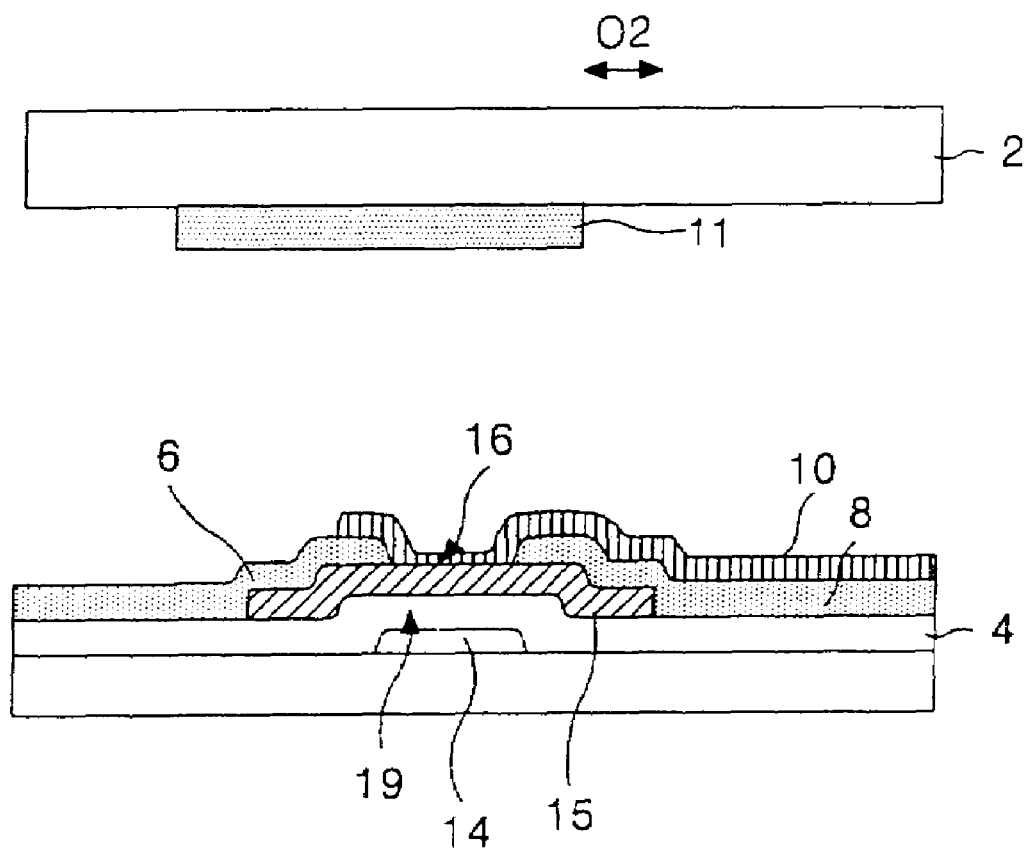
FIG. 3 is a section view of a thin film transistor taken along the line B-B' of FIG. 1.
Figure 4:
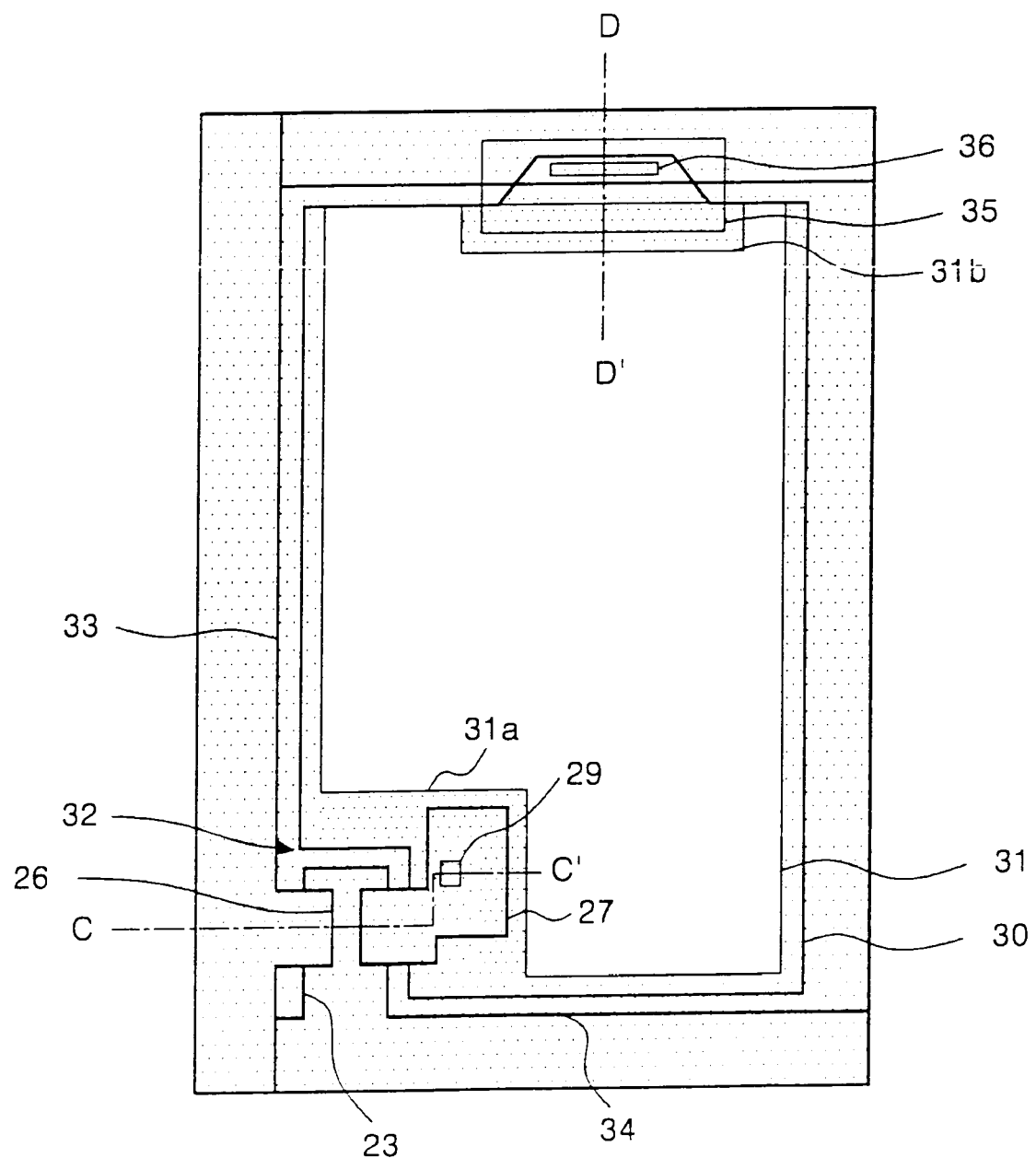
FIG. 4 is a plan view showing a structure of one pixel at a rear substrate of a liquid crystal display device according to an embodiment of the present invention.
Figure 5:
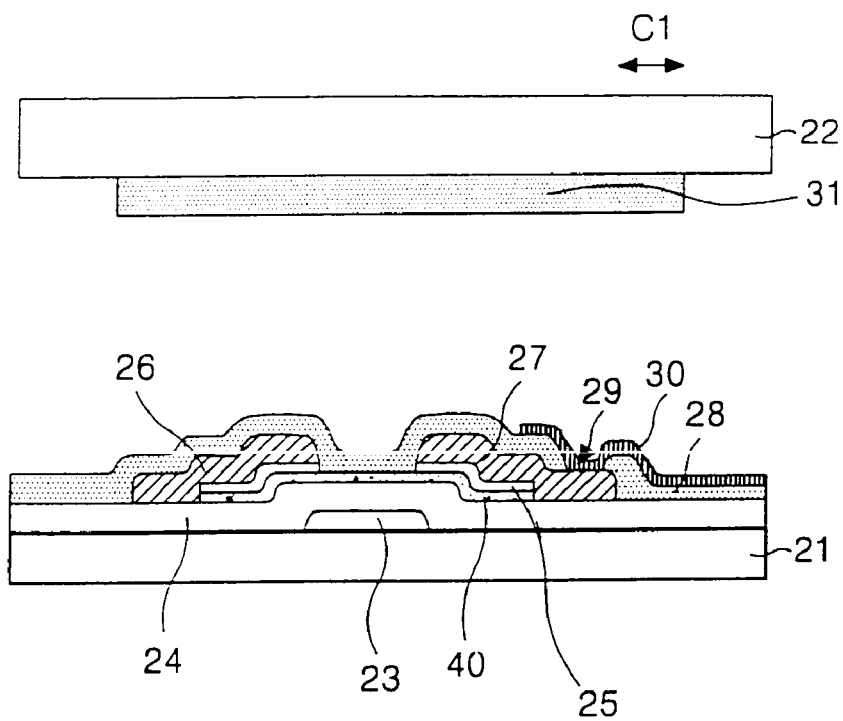
FIG. 5 is a section view of a thin film transistor taken along the line C-C' of FIG. 4.

As shown in FIGS. 4 and 5, an LCD device according to an embodiment of the present invention includes a gate line 34 and a data line 33 formed on a rear substrate 21 crossing each other. A pixel electrode 30 is formed at the interior thereof. A TFT 32 is formed at an intersection between the gate line 34 and the data line 33.

The TFT 32 includes a gate electrode 23, a source electrode 26 and a drain electrode 27 to apply a data signal at the data line 33 to the pixel electrode 30 during an "on" period of a scanning pulse to the gate electrode 23. The gate electrode 23 is connected to the gate line 34 while the source electrode 26 is connected to the data line 33. The drain electrode 27 is connected to the pixel electrode 30.

A process of fabricating such a TFT will be described below. First, a metal thin film is formed by depositing aluminum (Al) or copper (Cu) on the rear substrate 1 using, for example, a sputtering technique. The metal thin film is selectively patterned, to remain only at a desired portion of the rear substrate 21 using photolithography. A wet etching method may be used for the photolithography. The patterned metal thin film is formed into the gate electrode 23 and the gate line 34.

Subsequently, an insulating material, such as silicon oxide or silicon nitride, is deposited onto the entire substrate by chemical vapor deposition (CVD) to form a gate insulating film 24. The gate insulating film 24 covers the gate electrode 23 and the gate line 14. An active layer 40 and an ohmic contact layer 25 are sequentially deposited onto the gate insulating film 4 by, for example, CVD. The active layer 40 is made of an amorphous silicon or polycrystalline silicon, and is not doped with impurities. The ohmic contact layer 25 is made of amorphous silicon or polycrystalline silicon, and is doped with n-type or p-type impurities at a high concentration. The active layer 40 and the ohmic contact layer 25 are patterned by photolithography, including isotropic etching, to remain only at a portion corresponding to the gate electrode 23. The source electrode 26 and the drain electrode 27 are formed on the ohmic contact layer 25. The source electrode 26 and the drain electrode 27 are formed by depositing a metal such as molybdenum (Mo), titanium (Ti) or tantalum (Ta), etc., or a molybdenum alloy, such as MoW, MoTa or MoNb, etc. on the ohmic contact layer 25 using CVD or sputtering, and then patterning it. Upon patterning of the source electrode 26 and the drain electrode 27, the ohmic contact layer 25 on the gate electrode 23 is patterned due to an over-etching, to expose the active layer 40.

On the TFT 32 that has the structure as described above, an inorganic insulating material such as silicon oxide or silicon nitride, or an organic insulating material such as an acrylic compound, BCB (β-stagged-divinyl-siloxane-benzocyclobutene) or PFCB (perfluorocyclobutane), is deposited. The insulating material deposited on the TFT 32 in this manner becomes a passivation layer 28. A portion of the passivation layer 28 covering the drain electrode 27 is patterned. A contact hole 29 exposing the drain electrode 27 is defined in the patterned passivation layer 28. Subsequently, a transparent conductive material, such as ITO or IZO (indium-zinc-oxide), is deposited on the passivation layer 28 and the contact hole 29. The transparent conductive film contacts the drain electrode 27 through the contact hole 29. The transparent conductive film is patterned to remain only at a pixel area between the gate line 34 and the data line 33, thereby forming the pixel electrode 30.

Figure 6:
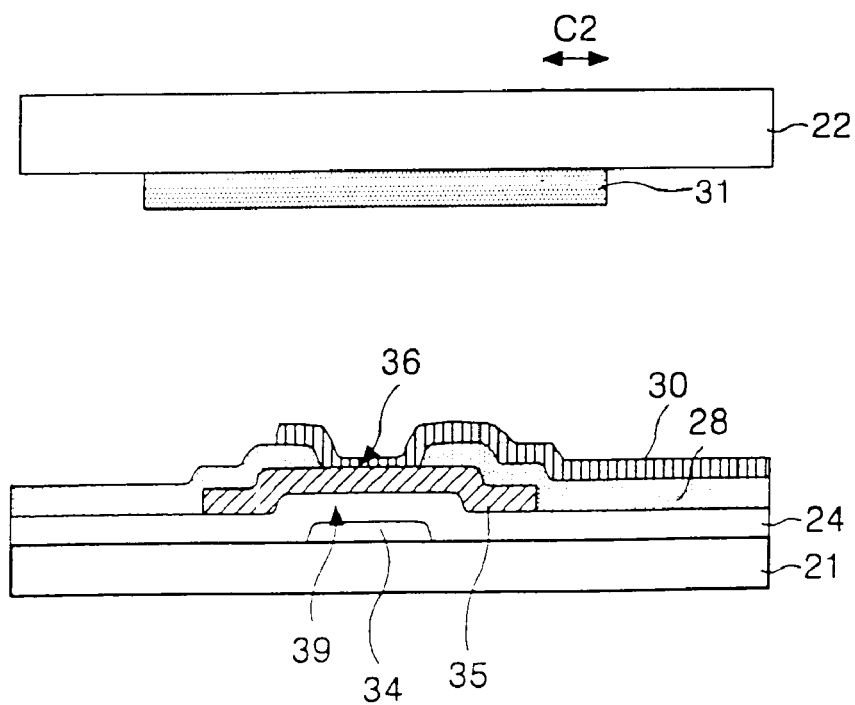
FIG. 6 is a section view of a thin film transistor taken along the line D-D' of FIG. 4.

The LCD device further includes a storage capacitor 39 formed on the gate line 14. The storage capacitor 39 accumulates a driving voltage (charge) for the next scanning line during the previous scanning period, to thereby lower the required driving voltage. An upper electrode 35 of the storage capacitor 39 is formed by patterning a metal or a metal alloy to overlap the gate line 34 upon formation of the source electrode 26 and the drain electrode 27, as shown in FIG. 6. The gate line 34 overlaps the upper electrode 35 and serves as a lower electrode of the storage capacitor 39. The upper electrode 35 of the storage capacitor 39 is connected, via a contact hole 36 formed by patterning of the passivation layer 30, to the pixel electrode 30.

A black matrix 31 is provided on a front substrate 22, which is opposed to the rear substrate 21, with a liquid crystal therebetween. The black matrix 31 is positioned at a portion other than an effective display area of a pixel, that is, at a boundary portion between pixels where the TFT 32, the data line 33, the gate line 34 and the storage capacitor 39 are positioned, so as to prevent a color signal interference between pixels and to shut off a reflected light inputted from the display screen. To this end, the black matrix 31 includes a first shield 31a overlapping the TFT 32, and a second shield 31b overlapping the storage capacitor 39. The first shield 31a extends, by a desired distance C1, from an end at the pixel electrode side of the drain electrode 27 as shown in FIG. 5, to thereby absorb light incident to the metal thin film of the TFT 32, including the drain electrode 27. The second shield 31b extends, by a desired distance C2, from an end at the pixel electrode side of the upper electrode 35, as shown in FIG. 6 to absorb light incident to the metal thin film of the storage capacitor 39, including the upper electrode 35. The black matrix 31 is formed on the front substrate 22 by coating an organic material, such as polyimide, to which a black pigment is added. Furthermore, on the front substrate 22 there is a common electrode, a color filter and an alignment film (not shown), in addition to the black matrix 31.

As described above, the black matrix formed at a boundary portion between pixels extends into the drain electrode of the TFT and the upper electrode of the storage capacitor. Accordingly, a deterioration of contrast caused by a reflected light incident on the metal thin film can be minimized. Such an LCD device is suitable, for example, for a display panel for aircraft cockpits exposed to direct sunlight.

Although the present invention has been explained by the embodiments shown in the drawings described above, it should be understood by the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:
   a plurality of gate lines arranged in a first direction;
   a plurality of data lines arranged in a second direction to cross the plurality of gate lines, at least one pixel area being defined between one of the gate lines and an adjacent one of the gate lines and between one of the data lines and an adjacent one of the data lines;
   a pixel electrode disposed in the pixel area;
   a thin film transistor at an intersection between the one of the gate lines and the one of the data lines, the thin film transistor including a drain electrode of a first metal thin film connected to the pixel electrode;
   a second metal thin film over the adjacent one of the gate lines and overlapping the pixel electrode to define a storage capacitor, the second metal thin film extended into the pixel area with a width in the first direction less than a separation between the one of the data lines and the adjacent one of the data lines so that the second metal thin film is separated with respect to the first direction from the one of the data lines and the adjacent one of the data lines;
   a black matrix disposed completely covering the plurality of gate lines and the plurality of data lines;
   a first light-shielding member extended from the black matrix into the pixel area to completely cover the thin film transistor; and
   a second light shielding member extended from the black matrix into the pixel area to completely cover the second metal thin film, the second light shielding member having a width in the first direction greater than that of the second metal thin film but less than a separation between the one of the data lines and the adjacent one of the data lines so that the second light shielding member is separated with respect to the first direction from the one of the data lines and the adjacent one of the data lines,
   wherein the first and second light shielding members each extend into the pixel area to provide a margin sufficient to block light incident on the first and second metal films.

* * * * *